US006837502B1

(12) United States Patent
Lee

(10) Patent No.: US 6,837,502 B1
(45) Date of Patent: Jan. 4, 2005

(54) COLLAPSIBLE DOLLY

(76) Inventor: Maximilian B. Lee, 14045 Leffingwell Rd. #602, Whittier, CA (US) 90604

( * ) Notice: Subject to any disclaimer, the term of this patent is extended or adjusted under 35 U.S.C. 154(b) by 0 days.

(21) Appl. No.: 10/373,359

(22) Filed: Feb. 24, 2003

(51) Int. Cl.$^7$ ................................................ B62B 1/04
(52) U.S. Cl. .................... 280/79.5; 280/652; 280/47.24
(58) Field of Search ............................... 280/79.5, 645, 280/651, 652, 655, 47.17, 47.24, 47.26, 47.315, 47.33, 38, 40

(56) References Cited

U.S. PATENT DOCUMENTS

| | | | | |
|---|---|---|---|---|
| 2,422,862 A | * | 6/1947 | Stottrup ...................... 280/641 |
| 2,612,386 A | * | 9/1952 | Schutzer et al. ......... 280/43.24 |
| 2,683,012 A | * | 7/1954 | Reinsma ...................... 248/129 |
| 3,035,847 A | * | 5/1962 | Born ........................... 280/654 |
| 3,655,212 A | * | 4/1972 | Krass et al. ................. 280/641 |
| 3,861,695 A | | 1/1975 | Shourek et al. ............. 280/5.24 |
| 4,199,171 A | * | 4/1980 | Betts ........................... 280/652 |
| 4,346,907 A | * | 8/1982 | Swann ..................... 280/47.18 |
| 4,355,818 A | * | 10/1982 | Watts ........................... 280/654 |
| 4,407,521 A | | 10/1983 | Zeitlin ......................... 280/655 |
| 4,458,914 A | | 7/1984 | Holtz ........................... 280/654 |
| 4,493,492 A | * | 1/1985 | Balabanova ................ 280/651 |
| 4,523,773 A | | 6/1985 | Holtz ........................... 280/654 |
| 4,749,209 A | * | 6/1988 | Edmonds .................... 280/652 |
| 4,974,871 A | | 12/1990 | Mao ............................. 280/651 |
| 5,088,751 A | | 2/1992 | Zint ......................... 280/47.34 |
| 5,127,664 A | | 7/1992 | Cheng ......................... 280/655 |
| 5,257,800 A | | 11/1993 | Yang ........................... 280/654 |
| 5,354,089 A | * | 10/1994 | Sohrt et al. .................. 280/645 |
| 5,380,033 A | | 1/1995 | Harling ....................... 280/654 |
| 5,433,463 A | | 7/1995 | Finley ..................... 280/47.16 |
| 5,549,317 A | | 8/1996 | Dunkle ........................ 280/652 |
| 5,951,037 A | | 9/1999 | Hsieh et al. ................. 280/655 |
| 5,971,424 A | | 10/1999 | Ingalls ......................... 280/654 |
| 5,988,671 A | * | 11/1999 | Abelbeck et al. ........... 280/649 |
| 6,027,128 A | | 2/2000 | Stich et al. .............. 280/47.16 |
| 6,053,516 A | | 4/2000 | Ottaway ..................... 280/79.5 |
| 6,179,306 B1 | | 1/2001 | Maxwell .................. 280/47.26 |
| 6,315,310 B1 | | 11/2001 | Hurt ............................ 280/79.5 |
| 6,447,002 B1 | | 9/2002 | Yang ........................... 280/646 |
| 6,454,281 B1 | | 9/2002 | Pearson ................... 280/47.26 |
| 6,505,843 B1 | * | 1/2003 | Williams .................. 280/47.26 |
| 2002/0105169 A1 | | 8/2002 | Dahl ........................... 280/651 |
| 2002/0180184 A1 | | 12/2002 | Chang ......................... 280/652 |
| 2003/0011173 A1 | | 1/2003 | Shall ........................... 280/651 |
| 2003/0025287 A1 | | 2/2003 | Kady ....................... 280/47.29 |

* cited by examiner

Primary Examiner—Christopher P. Ellis
Assistant Examiner—Jeff Restifo
(74) Attorney, Agent, or Firm—James G O'Neill, Klein, O'Neill & Singh, LLP

(57) ABSTRACT

A collapsible muck bucket cart or dolly easily movable between a storage position and an operative position. The dolly includes a telescopically extensible, angled rectangular main frame having a handle at an upper end and a foot for the dolly at a lower end; a cargo basket with a front lip and an aft lip; and at least one axle held in a transversal axle sleeve with a pair of pneumatic wheels coupled to the ends of the axle. Pivotally movable load bearing bars are connected to posterior sections of the cargo basket by lower ends, and upper ends of the loading bars are selectively connected to a middle section of the main frame. The exact connection of the loading bars to the middle section of the main frame, determines the storage or operative position of the dolly. The positioning of the cargo basket and the angle of the main frame optimizes the dolly for use in moving cargo, with a minimum of effort from the user.

16 Claims, 8 Drawing Sheets

COLLAPSIBLE DOLLY

BACKGROUND OF THE INVENTION

1) Field of Invention

The present invention relates to collapsible carts or dollies, and more particularly, to a new and improved collapsible muck bucket dolly for use in transporting of various items, such as containers containing water and/or manure, as well as bagged feed, bales of hay, and the like.

2) Description of the Prior Art

The use of collapsible carts or dollies is well known for use in transporting containers, such as round tubs with two rope handles at opposite sides, referred to as muck buckets, and having a capacity of 40 or 70 quarts. More specifically, carts or dollies heretofore devised and utilized for transporting items are known to consist basically of familiar, expected and obvious structural components for countless objectives and requirements. Examples of such known prior art is listed below:

| | |
|---|---|
| 5,088,751 | Feb. 18, 1992 |
| 5,380,033 | Jan. 10, 1995 |
| 5,433,463 | Jun. 18, 1995 |
| 5,971,424 | Oct. 26, 1999 |
| 6,315,310 | Nov. 13, 2001 |
| US2002\0105169 A1 | Aug. 8, 2002 |

Additionally, American Livestock Supply, Inc., 613 Atlas Ave., Madison, Wis. 53714 offers a muck bucket cart consisting of a triangular base frame with a transversal axle and two small, narrow width solid wheels rotatably coupled on the axle. Three perpendicular connecting bars are connected to the triangular base on its corners and support an upper or superior retainer ring. One of the connecting bars also serves as a post-handle and includes a lower portion connected to the base. The retainer ring is designed to handle a 70 quart muck bucket. This design although usable is inconvenient to use. The center of gravity of the cart is between the post-handle and the wheels, thus forcing the user to lift the cargo and pull it, without providing the user with sufficient leverage. Another inconvenience is that the fixed retainer ring only allows for fitting and carrying a 70 quarts muck bucket. Yet another problem occurs when the user wants to insert the muck bucket into or remove the muck bucket from the cart. The user has to lift the muck bucket high enough that the base of the bucket may clear the height of the retainer ring. If the bucket is filled with any content (i.e., water, manure, feed, etc) it could weight over 100 pounds, thus requiring sufficient strength or several persons to lift the bucket. Another inconvenience is that the post-handle is too short, thus causing users to bend their body out of their natural erect position when using the cart. The taller the user, the more the user has to bend, thus causing greater discomfort to the user and, preventing the user from using the cart for any extended period of time. Furthermore, users tend to straighten their posture to as to be straight and as close to their natural erect position as possible. This caused the dolly and its cargo to tip substantially. If the cargo is liquid, the users may spill some of the contents. Yet another inconvenience is that the two small, narrow width solid wheels are not convenient for use in outdoor settings, such as on grass, dirt floors, or other uneven and soft surfaces. The combination of the narrow width of the wheels and a heavy cargo cause the wheels to sink or get stuck, making it harder for the user to transport the cargo.

Therefore, there is a need in the art for a new and improved muck bucket cart or dolly that departs from conventional concepts and designs known in the prior art, and which in so doing provides an improved and simplified apparatus adapted for use in transporting a container or other item, such as a muck bucket, pail, bagged feed, bales of hay, or the like;

SUMMARY OF THE INVENTION

In view of the foregoing disadvantages inherent in known types of carts or dollies, the present invention provides a new collapsible cart or dolly construction wherein the same can be utilized for transporting a muck bucket, bagged feed, bales of hay, or the like in a more efficient and economical manner.

Therefore, it is a general object of the present invention to provide an improved and simplified transportation device.

It is a particular object of the present invention to provide a new and improved collapsible muck bucket dolly, which may be easily and efficiently manufactured and marketed.

It is a further particular object of the present invention to provide a new and improved collapsible muck bucket dolly, which is of a durable and reliable construction.

It is an even further particular object of the present invention to provide a new and improved collapsible muck bucket dolly, which is susceptible of a low cost of manufacture with regard to both material and labor, and which accordingly, is susceptible of sale at a low price to the consuming public, thereby making the collapsible muck bucket dolly economically available to the buying public.

Yet a further particular object of the present invention is to provide a new and improved collapsible muck bucket dolly that is easily moved between a lowered or storage position and an upper or operative position.

In accordance with one aspect of the present invention there is provided a dolly with a main frame having a lower component and an upper component. A mechanism is provided to allow the upper component to be moved with respect to the lower component so as to vary the height of a handle. The main frame is connected to the dolly at an angle and movable between collapsed and operative positions. A cargo basket is provided in the dolly connected to the main frame. The cargo basket is sized and dimensioned to support a muck bucket or the like therein with the main frame in the operative position and to accommodate cargo such as bags of feed, bales of hay, or the like when in the collapsed position.

There has thus been outlined, rather broadly, the more important features of the invention in order that the detailed description thereof that follows may be better understood, and in order that the present contribution to the art may be better appreciated. There will be additional features of the invention that will be described hereinafter and which will form the subject matter of the claims appended hereto.

In this respect, before examining each embodiment of the invention in detail, it is to be understood that the invention is not limited in its application to the details of construction and to the arrangement of the components sets forth in the following description or illustrated in the drawings. The invention is capable of embodiments and of being practiced and carried out in various ways. Also, it is to be understood that the phraseology and terminology employed herein are for the purpose of description only and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and specially the scientists, engineers, and the practitioners in the art who are not familiar with patents and legal terms or phraseology, to determine quickly from a cursory inspection the nature and essence of the ethical disclosure of the application. The abstract is neither intended to define the invention of the application, which is measured by the claims, nor is it intended to be limiting as to the scope of the invention any way.

These together with other objects of the invention, along with the various features of novelty which characterize the invention, are pointed out with particularity in the claims annexed to and forming a part of this disclosure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENT

Figure 1:
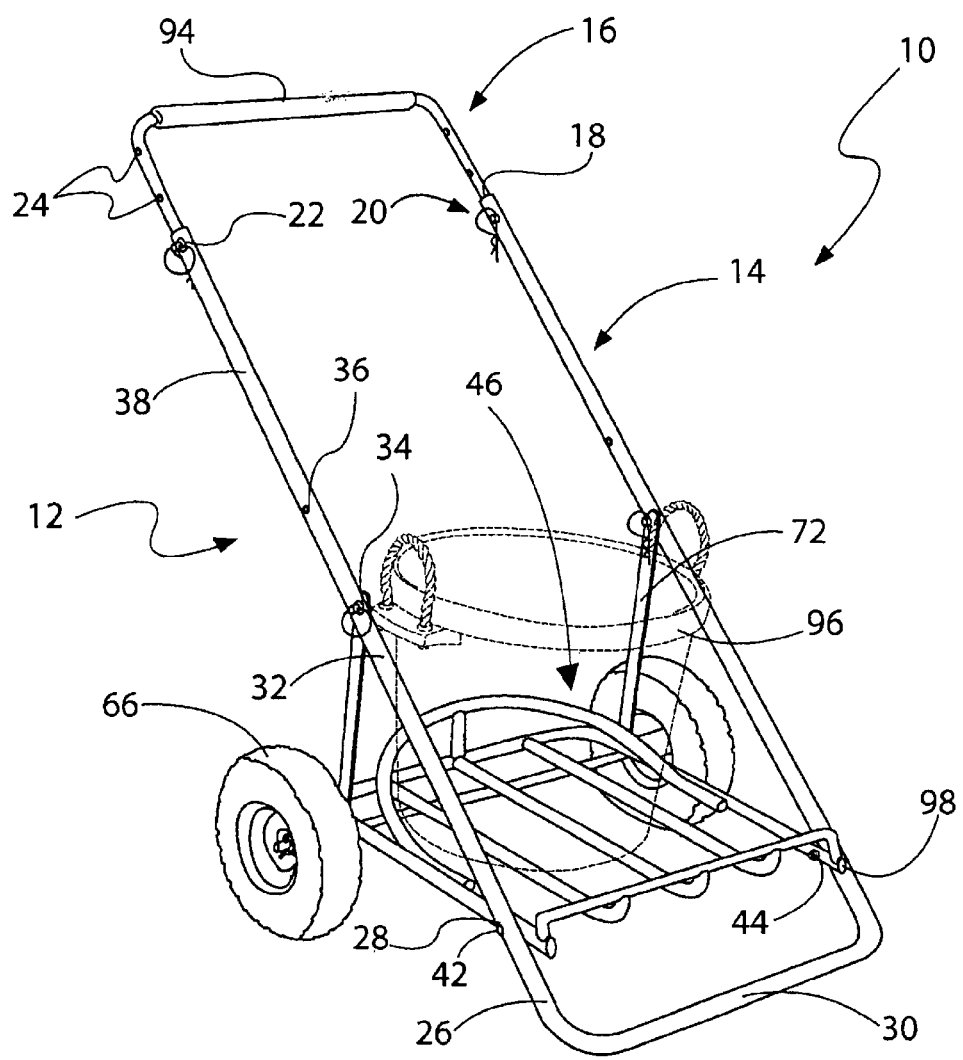
FIG. 1 is a perspective view of a new collapsible muck bucket dolly according to the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel and improved collapsible muck bucket cart or dolly generally designated by the reference numeral 10.

Figure 2:
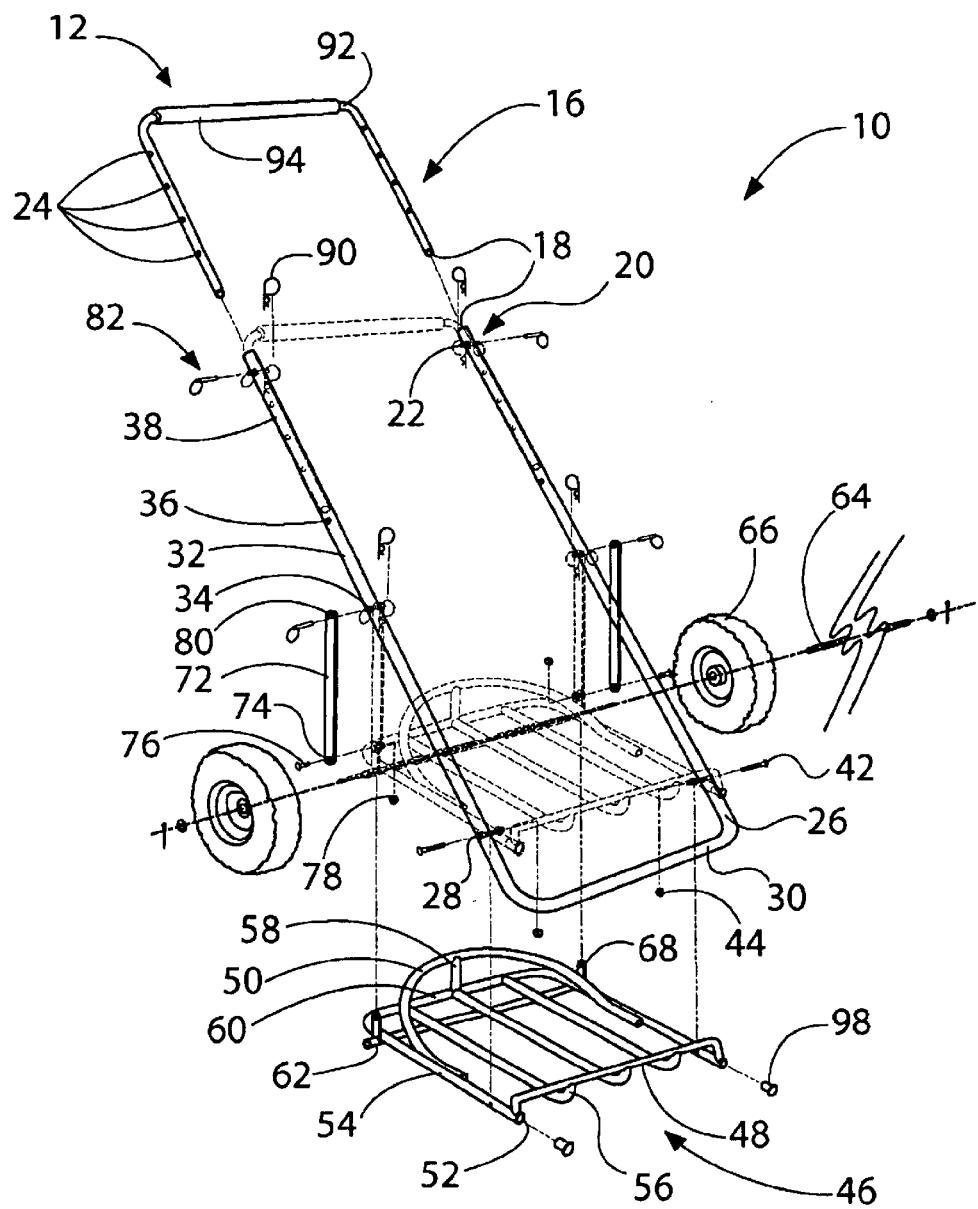
FIG. 2 is a perspective exploded view of the device of the present invention.

The present invention, as best shown in FIGS. 1 and 2, and generally indicated by reference numeral 10, is adapted for use with any size bundle or container, such, for example a 70 quart muck bucket 96 shown in phantom line in FIG. 1. The collapsible muck bucket dolly 10 generally comprises a main frame 12 and a cargo basket 46. The main frame 12 has generally a planar rectangular planform shape comprising at least two components. A lower component or portion 14 and an upper component or portion 16 are also preferably a planar substantially rectangular planform shape and are slidably or telescopically engaged through open ends 18 of both components. A holding or latching mechanism is provided to allow the upper component 16 to be extended upwardly or away from the lower component as it telescopes in relation to the lower component 14. The holding or latching mechanism may take any desired form, such as one or more removable pin sets, or the like 20 that transversely connect holes 22 on the upper section of the lower component 14 to a plurality of holes 24 on the lower section of the upper component 16.

The main frame 12 is preferably connected to the dolly so as to form an acute angle with the cargo basket 46 when looking at the dolly from front to back (diagonally to a horizontal plane or surface), while in an operative position, as shown in FIG. 1. The lower component 14 of the main frame consists of plurality of sections 26, 32 and 38. A lower section 26, which has holes 28 located therein, which holes are preferably square and about an inch below the radius of a wheel, in a vertical plane on each side of the dolly. The lower section 26 ends in an arcuate front end 30 that forms a foot or third base for the cart or dolly. This substantially long arcuate front end or third base 30 provides the dolly with better support on loose ground and a means for braking or holding the dolly in position, while in a resting position. A middle section 32 of the main frame has at least two transversal holes, one lower 34 and one upper 36, on each side. An upper section 38 has a transversal hole 22 located close to upper open ends on each side.

Figure 3:
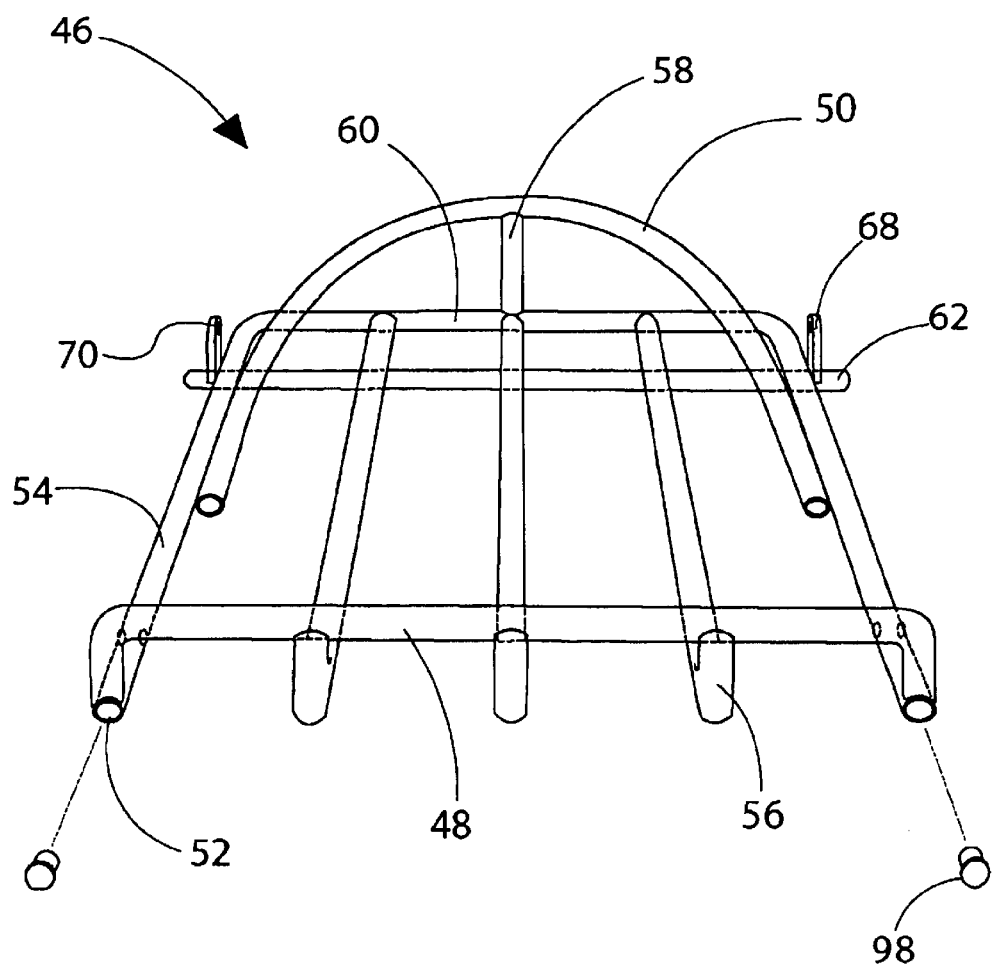
FIG. 3 is an enlarged perspective view of a cargo basket of the present invention.
Figure 7:
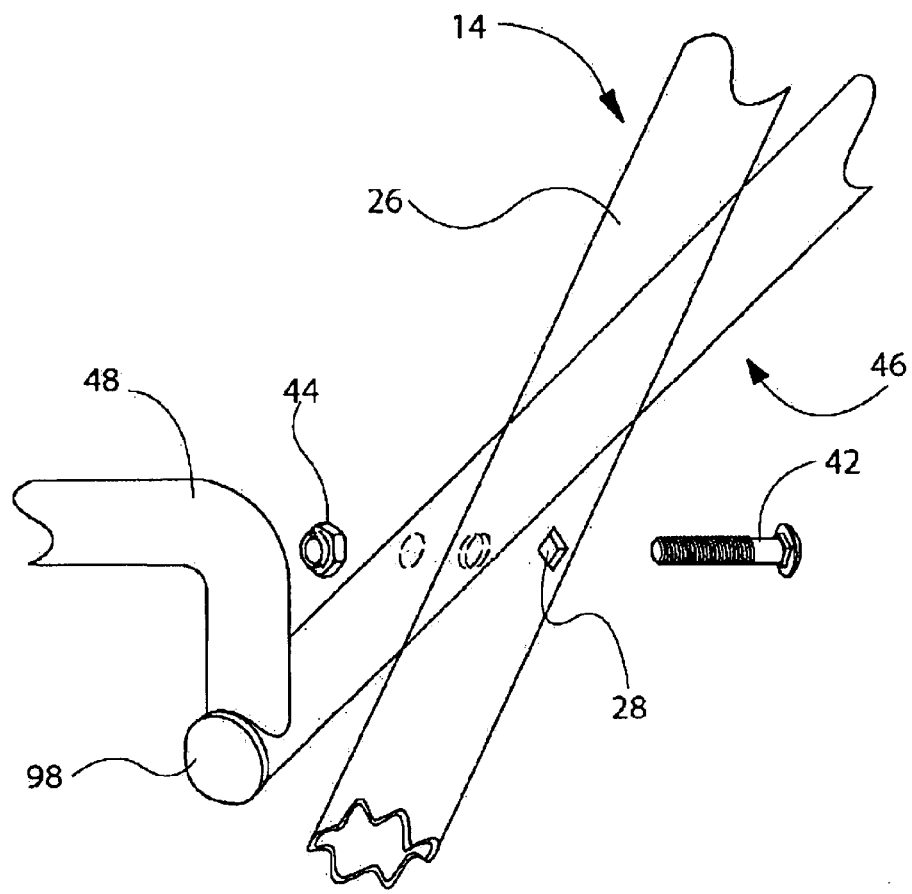
FIG. 7 is an enlarged partial view of a coupling mechanism between a lower section of a main frame and a cargo basket.

As is shown best in FIG. 7, each side of the lower section 26 of the main frame 12 is rotatably engaged with a frontal section of the cargo basket 46, with at least one holding element 42, such as a flat head screw and a lock nut 44 passing through an opening 28. This permits the main frame 12 to be rotated or to move pivotally with respect to the cargo basket 46. As it is best shown in FIG. 3, the cargo basket 46 is preferably substantially rectangular or square in shape, with at least one front lip or raised portion 48 and one aft lip or raised portion 50. The cargo basket 46 includes a frame 54 having a U-shaped bail with opened ends 52 facing forward, away from a set of wheels, described more fully below. Preferably polymer cylindrical shape plugs 98 are inserted in open ends 52.

At least one upside-down U-shaped bail connects the opened ends 52 of the cargo basket frame 46, to form the front lip 48, while at least one "L" shaped bar 56 connects the transversal and posterior bar 60 of the basket frame with the lower side of the front lip, to provide a support base for the cargo basket. Furthermore, the aft lip 50, preferably of semi-oval shape, of the cargo basket 46 is connected inboard of the lateral basket frame and is reinforced with a support bar 58 that is preferably perpendicular to a central and upper portion of the posterior bar 60 of the U-shaped bail with the opened ends 52 of the basket frame. The semi-oval shape aft lip 50 provides a centered and balanced support for the muck bucket when the dolly 10 is tilted backwardly around wheels 66 when moving the dolly. The short height of the aft lip 50 also allows the dolly to accommodate other cargo, such as bags, bales or the like. The aft lip 50 is preferably formed so as to be at an angle to a horizontal plane or a surface on which the dolly rests. This construction provides a cargo area, basket or support surface 46 on the dolly, which is preferably slightly wider than the diameter of a muck bucket, to create a compartment or well that is wide enough to accommodate not only a muck bucket but also bags of feed, bales of hay, or the like. The cargo basket 46 is slanted or tilted slightly downhill from the rear wheels 66, with respect to a horizontal plane or surface when the dolly is in the rest position shown in FIG. 1. This slight forward inclination in the resting position enables a load to be more easily inserted on or removed from the cargo basket, and is offset to the horizontal plane or surface when the cart is raised or in motion.

A user, in order to set the cart or dolly 10 in motion pushes down on an upper, non slippery handle 94, of the main frame 12 so as to raise the third base 30 slightly off the ground or other supporting surface, so as to release the brake created by its contact with the ground or other surface. This moves the cargo basket 46 from its inclined position so that it is substantially parallel to the ground and thus, is in a particularly good position for transporting containers having liquid therein.

The cargo basket 46 includes at least one axle sleeve 62 on a posterior section, preferably formed transversely to the cargo basket. The location of the axle sleeve 62 is selected to provide a good clearance from the ground to the rear portion of the cargo basket when the dolly is in motion. In essence, the radius of the wheels 66 is larger than the distance from the axle sleeve 62 to the end of the cargo basket.

An axle 64 is placed through the axle sleeve 62 and at least one pneumatic wheel 66 is rotatably coupled at each end of the axle. The wheels 66 are preferably at least 10 inches in diameter and about 4 inch wide in order to provide better support and maneuverability of the dolly, particularly when moving heavy and bulky items on a rough or soft surface.

Figure 5:
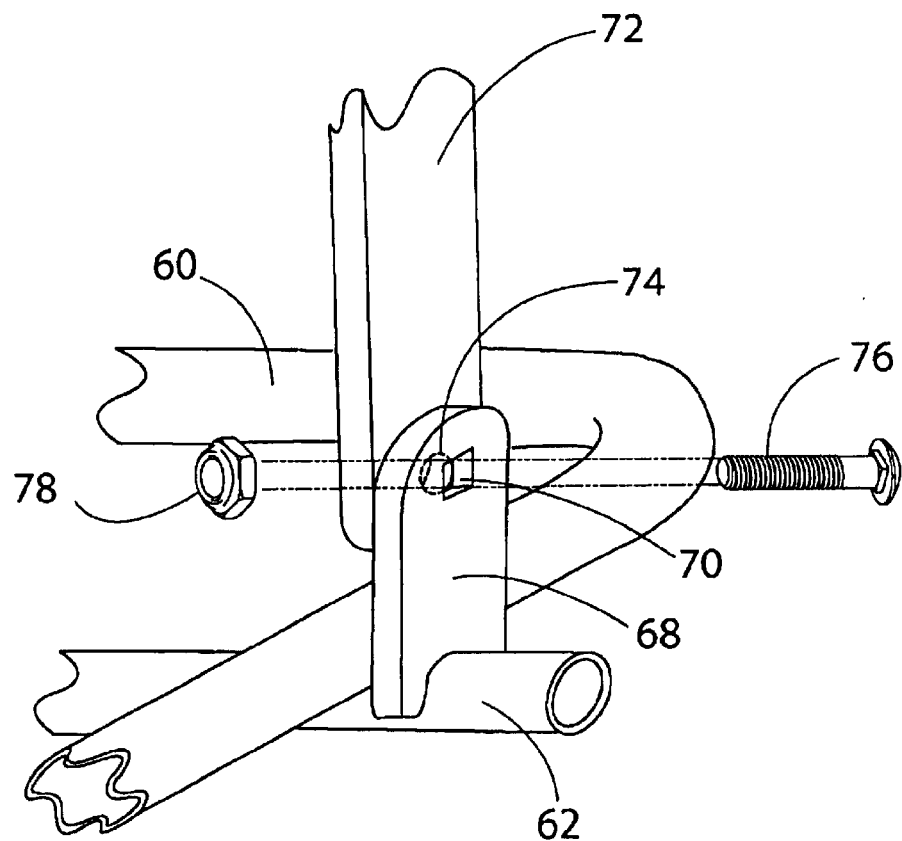
FIG. 5 is an enlarged fragmentary view of a coupling mechanism between a mounting prong and a load bearing bar.

As is shown best in FIGS. 3 and 5, the upper ends of the axle sleeve 62, on the peripheral side of the aft section of the cargo basket, are provided with flat short prongs 68 having openings 70 therein. These short prongs 68 constitute mounting prongs. The mounting prongs are rotatably engaged with flat load-bearing bars 72, the lower sections of which have apertures 74. The lower end of each of the load-bearing bars 72 engages or is connected to the mounting prongs 68 by means of a securing means 76 such as a flat head screw and a lock nut 78. This mounting allows the load-bearing bars 72 to move or rotate with respect to the mounting prongs 68.

Figure 4:
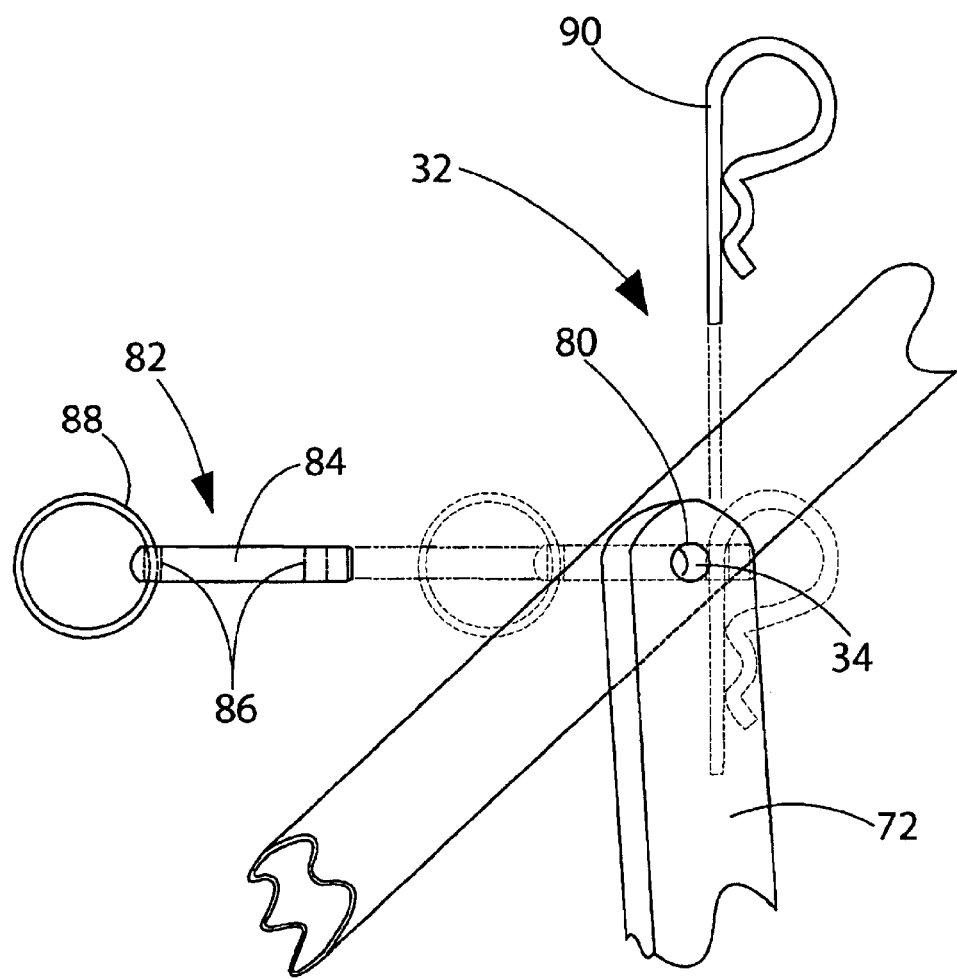
FIG. 4 is an enlarged fragmentary view of a coupling mechanism of a load bearing bar with an opening in a middle section of a main frame.

As is best shown in FIGS. 2 and 4, an upper hole 80 in each of the load-bearing bars 72 is removably engaged in the lower holes 34 of the middle section of the main frame, when the dolly in an operative position, or is selectively moved to the upper holes 36 of the middle section of the main frame, when in a storage or collapsed position, by means of holding elements 82. The storage or collapsed position is best shown in FIG. 8.

As shown in FIG. 4, the holding elements 82 preferably include at least one small cylindrical bar or rod 84 with a hole 86 at each end. A ring 88 passes through one of the holes 86 to enable a user to hook a finger in the ring and pull the bar. The other hole has a Cleavis pin 90 inserted therein. Removal of the pin and pulling of the ring allows the quick release of the holding elements 82 without the help of any tools.

Figure 6:
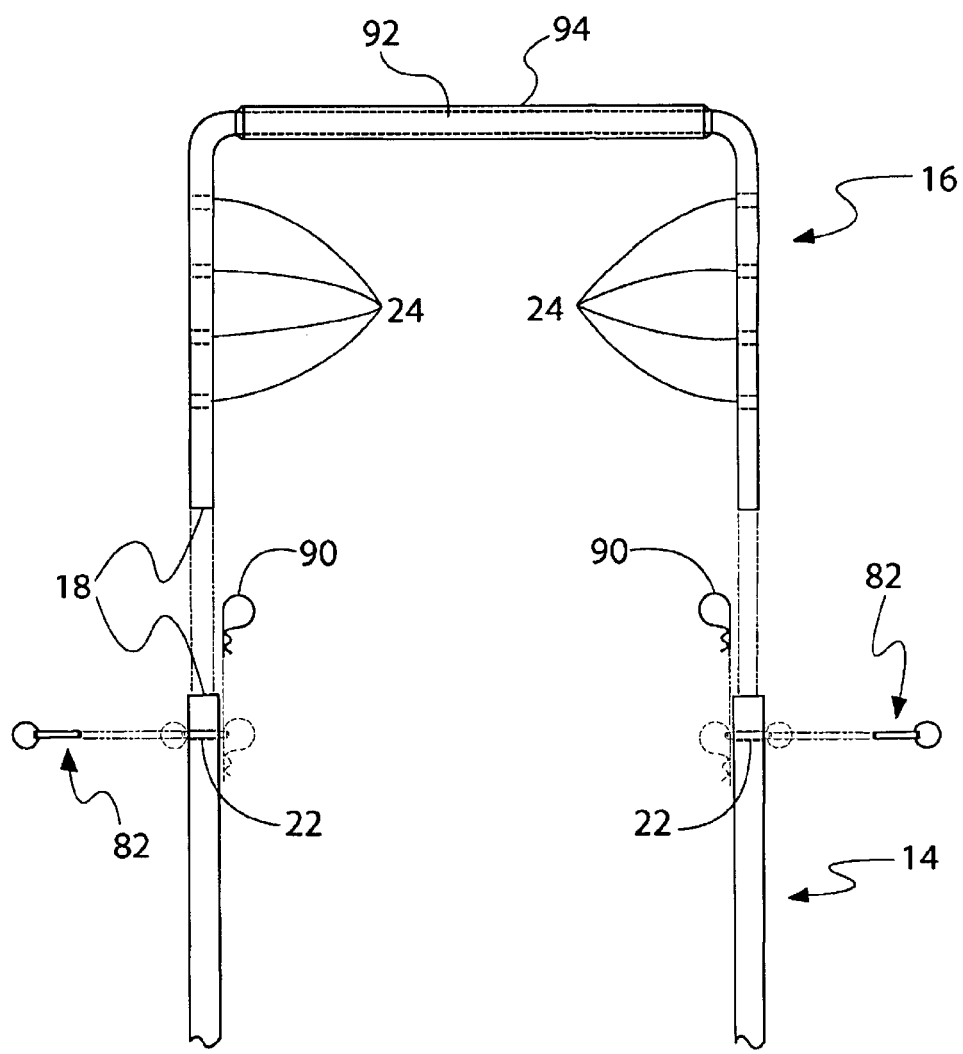
FIG. 6 is an enlarged partial view of a coupling mechanism between lower and upper components of a main frame.

As shown best in FIG. 6, a transverse bar 92 of the upper component of the main frame is preferably covered with a soft or cushiony foam-like material to provide the handle 94 with an easily gripped and preferably non-slippery surface.

Figure 8:
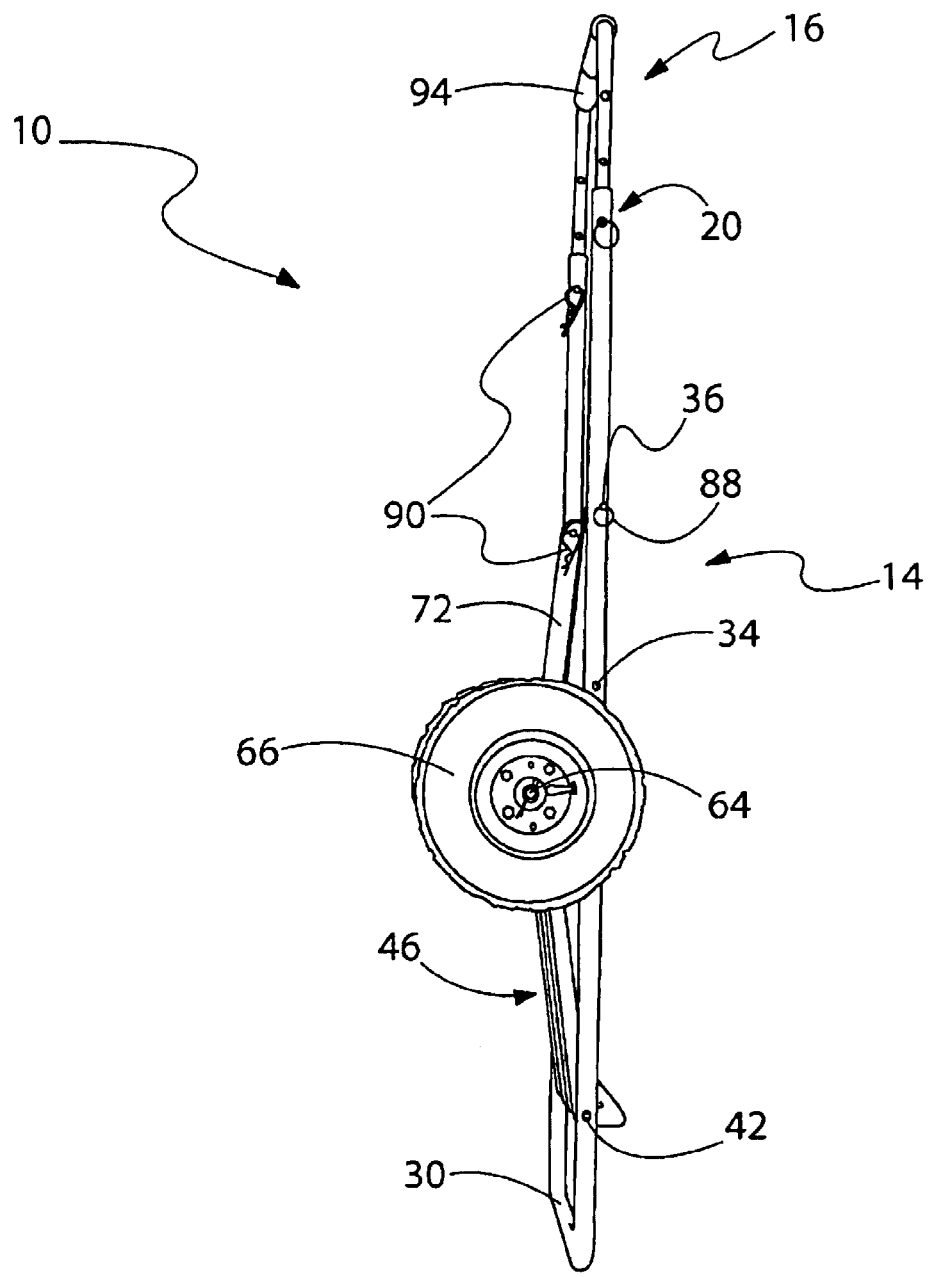
FIG. 8 is a side perspective view of a collapsible muck bucket dolly of the present invention, in a collapsed or storage position.

In use, starting from the operative position as shown in FIG. 1, the collapsible muck bucket dolly 10 can be collapsed to the storage position, shown in FIG. 8. This is done by disengaging the load bearing bars 72 from the lower hole 34 of the middle section 32 of the lower component 14 of the main frame 12. The disengagement is accomplished by removing the holding elements 82 and re-engaging the load bearing bars 72 in the upper holes 36 of the middle section 32 by re-inserting the holding elements 82. The reverse process can be applied to change the collapsed portion into the operative position.

With respect to the above description then, it is to be realized that the optimum dimensional relationship for the parts of the invention, to include variations of sizes, materials, shapes, forms, functions, and manners of operation, assemblies and uses, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention, further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A collapsible dolly comprising:
    an extensible, angled rectangular main frame;
    a cargo basket having a front portion rotatably secured to a lower section of the main frame; the cargo basket having a front lip and an aft lip for supporting a container therein;
    an axle held in a transversal axle sleeve secured to a lower portion of the cargo basket;
    a pair of enlarged pneumatic wheels coupled to opposed ends of the axle; and
    a pair of load bearing bars having upper ends and lower ends; the lower ends being pivotably connected to posterior sections of the cargo basket, adjacent the pair of enlarged pneumatic wheels, and the upper ends being selectively connected to a middle section of the main frame, whereby the dolly may be easily movable between a storage position and an operative position.

2. The collapsible dolly of claim 1 wherein the extensible, angled rectangular main frame comprises a lower component and an upper component which are telescopically held together and adjustable with respect to each other by means of a pair of latching mechanisms held in the extensible, angled rectangular main frame.

3. The collapsible dolly of claim 2 wherein the lower ends are held in raised short prongs secured to the transversal axle sleeve by means of securing means passing through aligned openings in the short prongs and the lower ends.

4. The collapsible dolly of claim 3 wherein the cargo basket is substantially rectangular in shape with a substantially straight front lip and a substantially oval shaped aft lip; and wherein the cargo basket includes a U-shaped outer frame edge and at least one support bar extending between the substantially straight front lip and the substantially oval shaped aft lip to form a bottom support for a container placed in the cargo basket.

5. The collapsible dolly of claim 4 wherein the upper ends are selectively connected in lower or upper openings formed in the middle section of the main frame by easily removable holding elements, whereby if the holding elements are in the lower openings the dolly will be in an operative position with the extensible, angled rectangular main frame at an acute angle to a horizontal surface with an arcuate front end of the lower component forming a foot for the collapsible dolly, below the cargo basket; and if the holding elements are in the upper openings the collapsible dolly will be in the storage position.

6. The collapsible dolly of claim 5 wherein the substantially straight front lip and the substantially oval shaped aft lip are substantially low whereby a container may be easily inserted into or removed from the cargo basket, while being prevented from falling off during movement of the dolly.

7. A collapsible muck bucket dolly comprising:

an extensible, angled rectangular main frame;

a cargo basket having a front portion rotatably secured to a lower section of the main frame; the cargo basket having a front lip and an aft lip for supporting a muck bucket therein;

an axle held in a transversal axle sleeve secured to a lower portion of the cargo basket;

a pair of enlarged pneumatic wheels coupled to opposed ends of the axle;

a pair of load bearing bars having upper ends and lower ends; the lower ends having apertures therein to enable them to be pivotably connected to posterior sections of the cargo basket, adjacent the pair of enlarged pneumatic wheels, and the upper ends having openings therein to allow them to be selectively connected to a middle section of the main frame, whereby the dolly may be easily movable between a storage position and an operative position; and a lower section of the main frame ending in an arcuate front end that forms a foot for the muck bucket dolly.

8. The collapsible muck bucket dolly of claim 7 wherein the extensible, angled rectangular main frame comprises a lower component and an upper component which are telescopically held together and adjustable with respect to each other by means of a pair of latching mechanisms held in opposed sides of the extensible, angled rectangular main frame.

9. The collapsible dolly of claim 8 wherein the lower ends are held in raised short prongs secured to the transversal axle sleeve by means of securing means passing through aligned apertures in the short prongs and the lower ends.

10. The collapsible dolly of claim 9 wherein the cargo basket is substantially rectangular in shape with a substantially straight low front lip and a substantially oval-shaped low aft lip; and wherein the cargo basket includes a U-shaped outer frame edge and at least one support bar extending between the substantially straight low front lip and the substantially oval-shaped low aft lip to form a bottom support for a muck bucket held in the cargo basket.

11. The collapsible dolly of claim 10 wherein the upper ends are selectively connected in lower or upper holes formed in the middle section of the main frame by easily removable holding elements, whereby if the holding elements are in the lower holes the dolly will be in the operative position with the extensible, angled rectangular main frame at an acute angle to a horizontal surface; and if the holding elements are in the upper holes the collapsible dolly will be in the storage position.

12. The collapsible dolly of claim 11 wherein the substantially straight low front lip and the substantially oval-shaped low aft lip allow a muck bucket to be easily inserted into or removed from the cargo basket, while preventing a muck bucket from falling off during movement of the dolly.

13. A collapsible muck bucket dolly comprising:

an extensible, angled rectangular main frame having a lower component and an upper component;

a cargo basket rotatably secured to the main frame; the cargo basket having a low front lip and a low aft lip for supporting a muck bucket therein;

an axle held in a transversal axle sleeve secured to a lower portion of the cargo basket;

a pair of enlarged pneumatic wheels coupled to opposed ends of the axle;

a pair of load bearing bars having upper and lower ends; the lower ends having apertures therein to enable them to be pivotably secured to raised short prongs secured to the transversal axle sleeve at a posterior section of the cargo basket, adjacent the pair of enlarged pneumatic wheels, and the upper ends being selectively connected in lower or upper holes formed in a middle section of the main frame by easily removable holding elements, whereby the dolly may be easily movable between a storage position and an operative position;

the lower component and the upper component being telescopically held together and adjustable with respect to each other by means of a pair of latching mechanisms held in opposed sides of the extensible, angled rectangular main frame; and the lower component having a lower section that ends in an arcuate foot for the forming a foot for the collapsible muck bucket dolly below the cargo basket to provide the collapsible muck bucket dolly with better support and a means for holding the collapsible muck bucket dolly in position, while in a resting position.

14. The collapsible dolly of claim 13 wherein the lower ends are pivotably held in the short prongs by means of releasable securing means passing through aligned apertures in the short prongs and the lower ends.

15. The collapsible dolly of claim 14 wherein the cargo basket is substantially rectangular in shape with a substantially straight low front lip and a substantially oval-shaped low aft lip; and wherein the cargo basket includes a U-shaped outer frame edge and at least one support bar extending between the substantially straight low front lip and the substantially oval-shaped low aft lip to form a bottom support for a muck bucket held in the cargo basket.

16. The collapsible dolly of claim 15 wherein the substantially straight low front lip and the substantially oval-shaped low aft lip allow a muck bucket to be easily inserted into or removed from the cargo basket, while preventing a muck bucket from falling off during movement of the dolly.

* * * * *